Figure 3A:
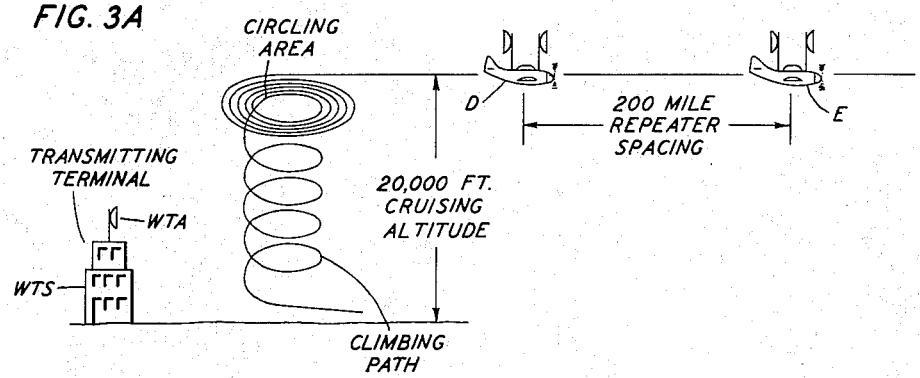

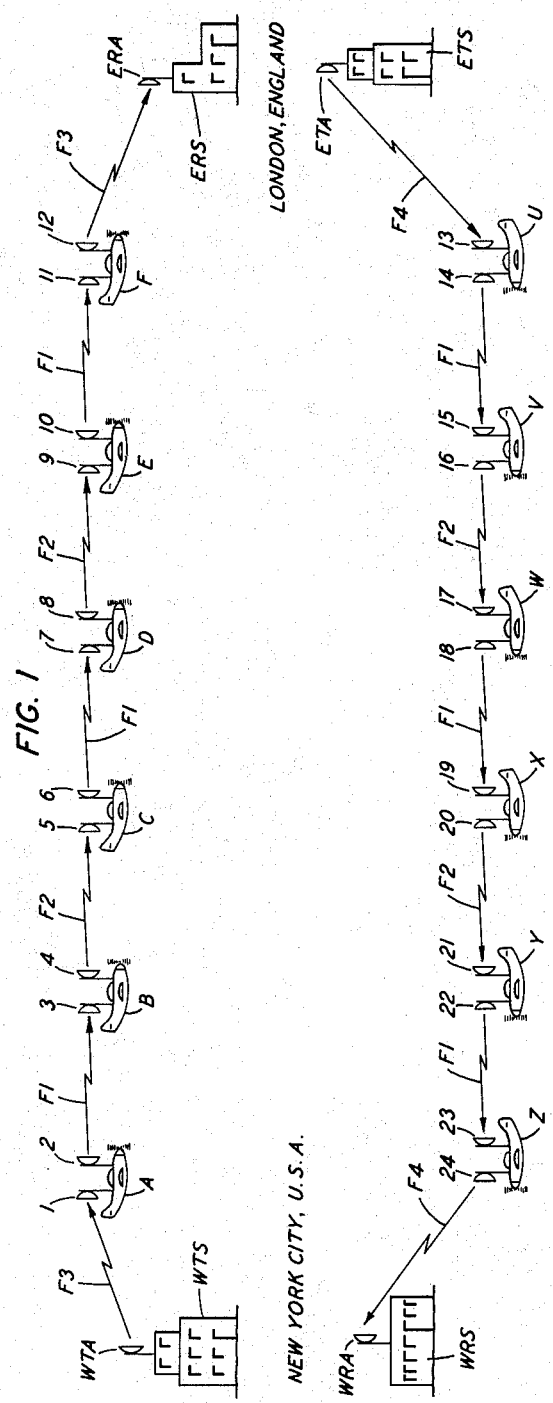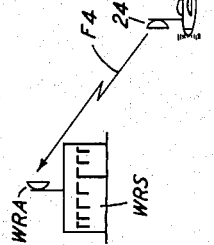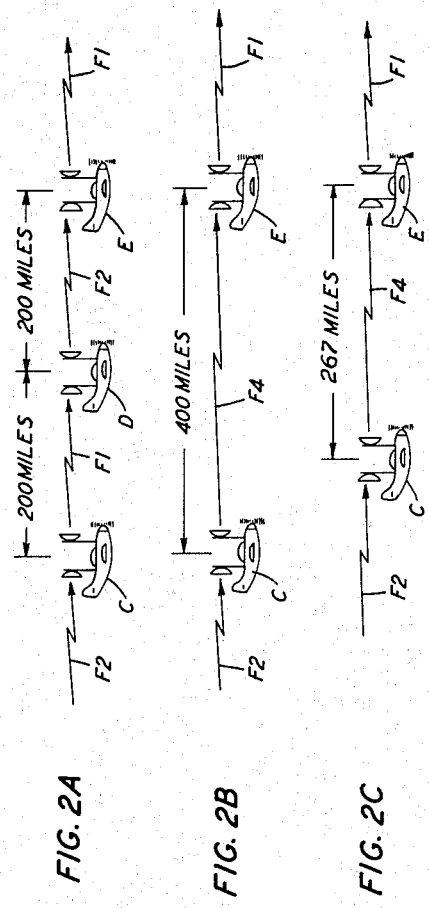
FIG. 1  FIG. 2A  FIG. 2B  FIG. 2C
INVENTOR
R.C. BOYD
BY
ATTORNEY May 29, 1956  R. C. BOYD  2,748,266
RADIANT ENERGY RELAY SYSTEM
Filed Dec. 18, 1952  4 Sheets-Sheet 2

INVENTOR
R.C. BOYD
BY
B. F. Stoddard
ATTORNEY

May 29, 1956  R. C. BOYD  2,748,266
RADIANT ENERGY RELAY SYSTEM
Filed Dec. 18, 1952  4 Sheets-Sheet 3

INVENTOR
R. C. BOYD
BY
*Stoddard*
ATTORNEY

INVENTOR
R. C. BOYD
BY
*BH Stoddard*
ATTORNEY

United States Patent Office 2,748,266
Patented May 29, 1956

2,748,266

RADIANT ENERGY RELAY SYSTEM

Richard C. Boyd, Summit, N. J., assignor to Bell Telephone Laboratories, Incorporated, New York, N. Y., a corporation of New York Application December 18, 1952, Serial No. 326,751

1 Claim. (Cl. 250—15)

This invention relates to radiant energy relay signaling systems and, more particularly, to a system of this type having mobile relay signaling stations moving in a continuously progressing succession.

Heretofore, repeater equipments of radiant energy relay signaling systems have been located at relay stations which have been of such structural nature that they have had to avoid certain types of regions having undesirable physical characteristics. Consequently, radiant energy relay systems have not been operated over regions of this type. For example, no radiant energy relay signaling system has as yet been established over large areas of water such as the Atlantic Ocean. Furthermore, as these relay stations usually perform no useful service in addition to their repeating function, the entire expense of constructing, operating, and maintaining such relay stations has been charged solely to the overall cost of the system.

Accordingly, it is an object of this invention to provide a radiant energy relay signaling system with an improved method of relaying signals.

An additional object of the invention is to enable the relay stations in a radiant energy relay signaling system to perform another useful service in addition to their repeating function.

Still another object of the invention is to provide a radiant energy signaling syestem with means for relaying signals over large areas of water, such as an ocean.

These and other objects of the invention are accomplished in a radiant energy relay signaling system by employing mobile relay signaling stations moving in a continuously progressing succession between the terminal stations. The mobile relay stations are constituted by conveyances having carrying capacities considerably in excess of that required by the radiant energy signal repeating equipments. Since the conveyances move in a progressing succession like an endless chain, the excess carrying capacity can be utilized to commercial advantage, such as by carrying passengers, freight, or other pay loads. This enables them to perform a dual function by carrying both the signal repeating equipments and commercial transport loads. Various types of conveyances may be used, such as automobiles, ships, or airplanes. If the units of the moving chain of conveyances are airplanes of the Stratocruiser type, then the system may be extended over any type of region including the oceans.

Signals transmitted over the system may be any desired type, such as speech, facsimile, or television signals. The signals are transmitted between the units of the moving chain of conveyances by the alternate use of two frequency allocations in order to minimize interference. A third frequency is used for signal transmission between the end relay stations and the terminal stations. A fourth frequency is employed for bridging two links in the chain in the event of a failure of a relay station. Various combinations of these four frequencies are utilized for inserting a relay station at a terminal point into the moving chain, and for dropping a relay station out of the moving chain at an intermediate point and at the same time replacing it with another relay station so as to maintain an uninterrupted signal transmission path.

Figure 3B:
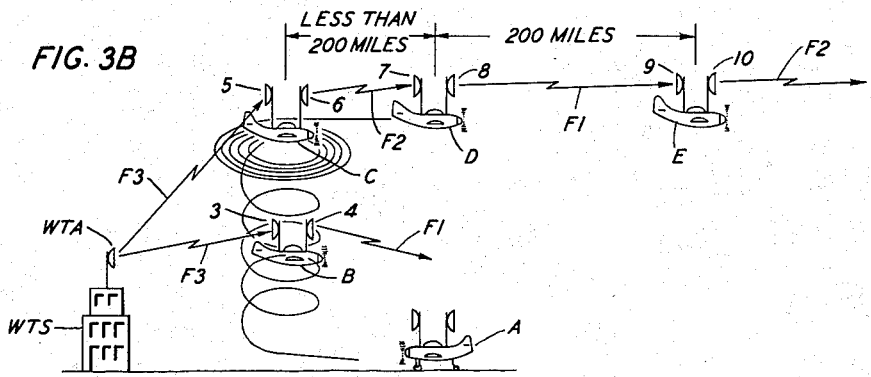
Figure 3C:
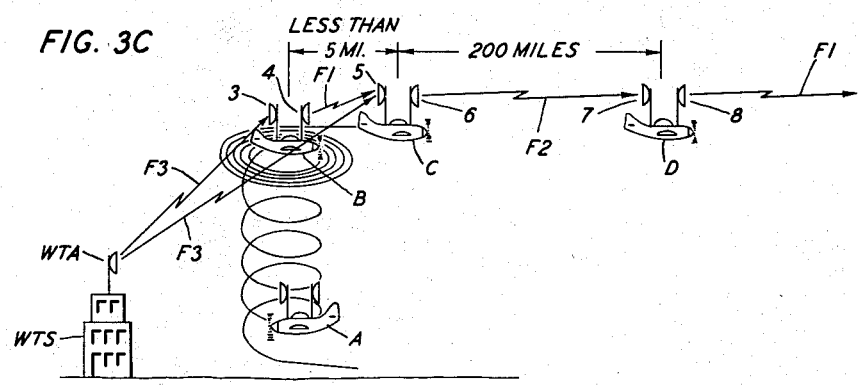
Figure 4A:
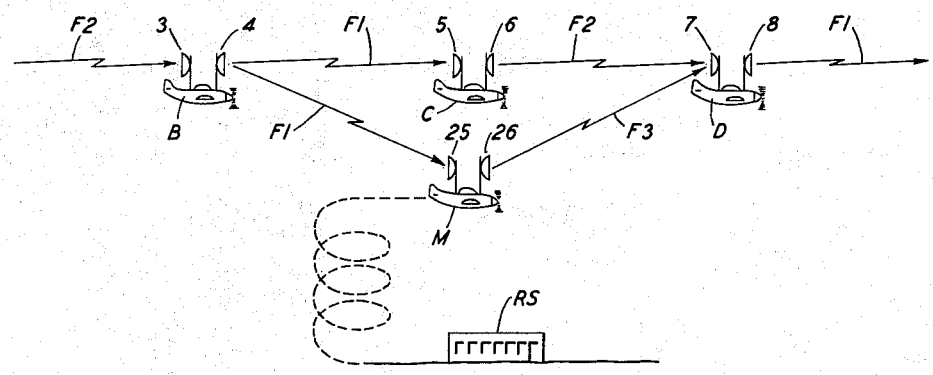
Figure 4B:
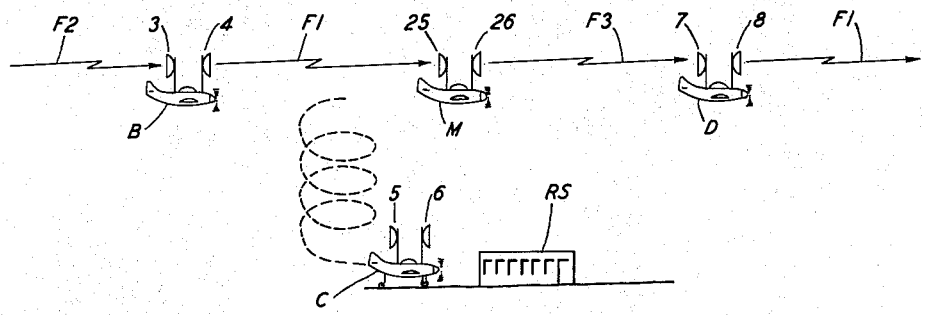
Figure 4C:
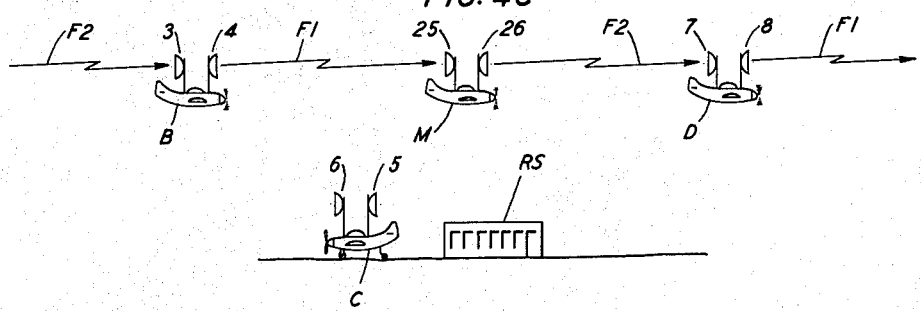
Figure 5A:
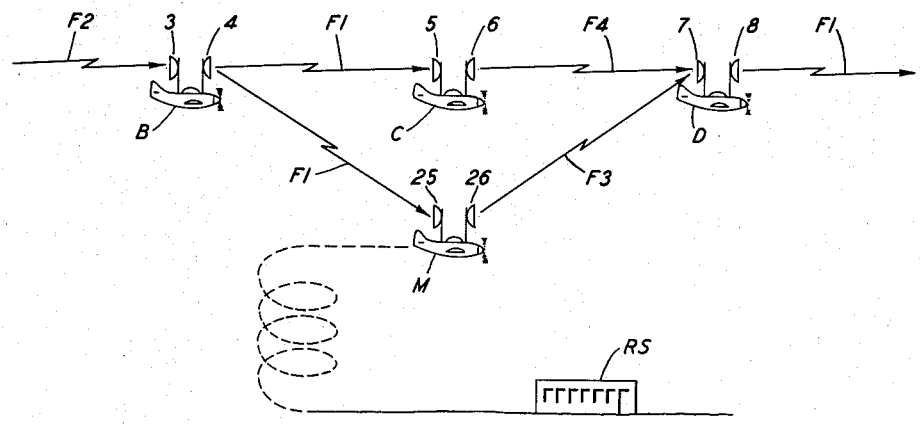
Figure 5B:
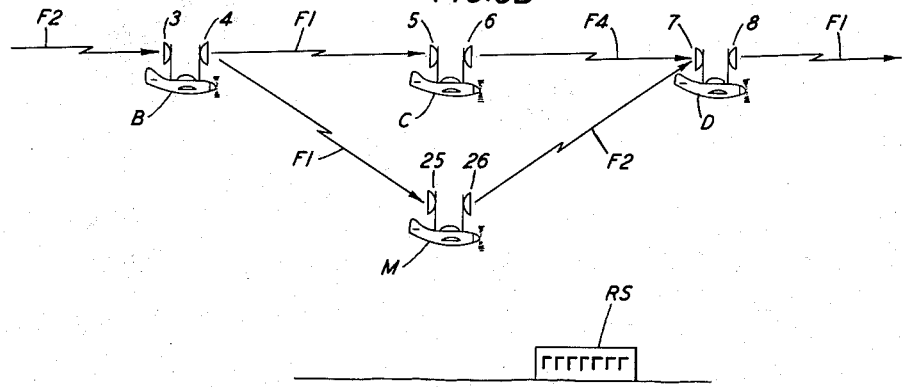
Figure 5C:
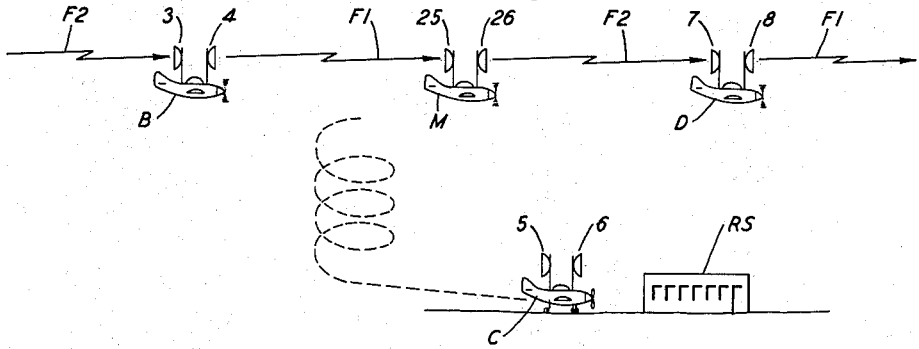

These and other features of the invention are more fully discussed in connection with the following detailed description of the drawing which shows a radiant energy relay signaling system in which the relay signaling stations are constituted by a progressing succession, or moving chain, of airplanes of the Stratocruiser type. It is to be understood that the use of airplanes is shown for illustrative purposes and that the invention is not limited to this type of conveyance because, as was stated above, other types of conveyances, such as automobiles or ships, may be used if desired. In respect to the figures included in the drawings:

Fig. 1 is a schematic diagram of the overall system;

Figs. 2A, 2B, and 2C illustrate the method of bridging two links in the moving chain of conveyances in the event of a failure of a relay station;

Figs. 3A, 3B, and 3C illustrate the method of inserting a relay station at a terminal point of the system into the moving chain of conveyances;

Figs. 4A, 4B, and 4C illustrate one method of removing a relay station from the moving chain at an intermediate point in the system and at the same time replacing it with another relay station so as to maintain a continuous signal transmission path;

Figs. 5A, 5B, and 5C illustrate an alternative method of substituting one relay station for another at an intermediate point in the system without interrupting the signal transmission path.

In order to explain the principles and features of operation of the invention with reference to a specific embodiment thereof, the system shown in the drawing will be described as constituting a transatlantic radio television relay system extending across the Atlantic Ocean between New York city, U. S. A., and London, England. It is to be understood that the invention is not restricted to the transmission of television signals because, as was stated above, other types of signals may be transmitted with equal facility. It is also to be understood that the invention is not limited to transmission over oceanic areas but is equally applicable to transmission over land routes, such as a route extending from New York city to San Francisco.

Considering now Fig. 1 with the above understanding in mind, the left portion of the figure should be regarded as being situated near New York city, the middle portion as being over the Atlantic Ocean, and the right portion as being near London, England. Thus, at the left in Fig. 1, the western transmitting terminal station WTS and the western receiving terminal station WRS are situated at the suitable location near New York city while the eastern receiving terminal station ERS and the eastern transmitting terminal station ETS are located near London. Each terminal station is provided with a transmitting or receiving directive antenna WTA, WRA, ERA, or ETA of suitable design, such as the parabolic reflector dish type of antenna. Although in Fig. 1, the terminal stations are represented as being located in separate buildings, it is to be understood that, at each end of the system, both transmitting and receiving terminal equipment may be located in the same building provided proper precautions are taken to minimize interference between the transmitted and received signals. It is also to be understood that the terminal stations may be provided with additional repeating equipment for separately transmitting or relaying the signals over spur or auxiliary transmission channels or local circuits to other stations. For example, the eastern receiving station ERS may be provided with radio repeating equipment for relaying the television signals transmitted originally from New York city, to Paris, France, or to other European cities.

Fig. 1 also shows that the relay stations are constituted by two moving chains of airplanes, one of which comprises in part the airplanes A, B, C, D, E, and F moving from west to east, and the other includes in part the airplanes U, V, W, X, Y, and Z flying from east to west. It is to be understood that the relay stations need not necessarily be constituted by airplanes but could be constituted by ships. It is also to be understood that, for purposes of simplicity, a smaller number of airplanes have been shown in Fig. 1 than are actually required by a relay system of this great length. Several different air routes between New York and London are available. However, in the specific embodiment of the invention now being described, each moving chain of airplanes follows approximately the same great circle route having a distance of approximately 3,500 miles between New York city and London. Starting from New York city, the route follows 1,200 miles along the coastline to Newfoundland, and then extends 2,000 miles across the North Atlantic Ocean. The remainder of the route is over land except for a portion of about 100 miles over the Irish Sea.

Each of the airplanes in the moving chains carries repeating equipment for receiving and transmitting radiant energy signals. It is desirable that these signals be transmitted by means of frequency modulation of a carrier in order to minimize repeater distortion requirements. It is also desirable that the maximum frequency deviation of the carrier should be about equal to twice the width of the applied video band. Since the applied video band is approximately 4 megacycles, the width of the corresponding radio frequency carrier band is of the order of 10 megacycles. In order to obtain reliable transmission, these considerations make it preferable to employ microwave carrier frequencies which are restricted to optical or line-of-sight transmission paths.

As the antennas and the repeater power equipments are airborne, both their size and weight are important factors. Therefore, since the free space loss between antennas of given apertures varies inversely as the square of the frequency, it is advantageous to use as high frequency as is practicable in order to obtain high gain in antennas of moderate size thereby permitting lower repeater power requirements. It has been determined that a carrier frequency of about 6,000 megacycles is the most practicable because attenuation due to rain increases rapidly with higher frequencies. Using carrier frequencies in this range enables highly directive parabolic dish antennas provided with tracking equipment to furnish sufficient gain when they are about six feet in diameter. Each airplane carries both a receiving and a transmitting antenna as is indicated in Fig. 1 by the reference characters 1 to 24, inclusive. For convenience, the antennas 1 to 24 have been represented in the drawing by simple schematic symbols, whereas they are actually mounted in domes of the so-called "blister" type. The weight of these antennas and the repeating equipment is not excessive because, after this weight has been subtracted from the carrying capacity of a standard Stratocruiser and after allowance has been made for the weight of the crew, fuel and normal flight equipment, there will still be a carrying capacity of approximately 5 tons available for regular commercial traffic.

The moving chain of airplanes normally has a uniform spacing of 200 miles between successive airplanes, as is indicated in Fig. 3A. Using the above-mentioned carrier frequency with this repeated spacing, an altitude of 11,000 feet would provide a transmission path having sufficient clearance for the signals to be well received. However, the type of airplane used in this system normally cruises at an altitude of 20,000 feet, as is also indicated in Fig. 3A, and this provides additional clearance which aids in compensating for any path loss that might result from fading and also aids in furnishing a margin of safety for use in the event that an airplane should suddenly be forced to drop out of the chain as is discussed hereinafter.

As the type of airplane used in this system has a cruising speed of about 200 miles per hour, approximately 17½ hours are required for an airplane to travel the above-mentioned route. This results in substantially the same length of time being required either to establish the complete transmission circuit or to discontinue it. Due to the magnitude of this time period, it is practicable to operate the system on a 24-hour basis. Since the airplanes and their repeater equipments that are flown in one direction to one terminal station must also be flown in the opposite direction back to the terminal station from which they started, it is efficient to operate the system on a two-way basis. Thus, with the airplanes spaced 200 miles apart and flying at a speed of 200 miles per hour, a continuous two-way transmission circuit can be maintained by having an airplane leave each terminal station every hour thereby producing a total of 48 one-way flights per day. This is not an impracticable number of flights because a considerable portion of them can be combined with regularly scheduled commercial flights since, as was stated above, each airplane has an excess carrying capacity of 5 tons which is available for ordinary commercial traffic purposes.

The chief operational problem in this transatlantic radio television relay system is the allocation of carrier frequencies in such a manner as to insure that the succession of airplane repeaters moving over the ocean will be able to maintain a continuous transmission path for the television signals under both normal and emergency operating conditions. The carrier frequencies should also be so allocated as to minimize interference between successive airplanes moving in one direction, between airplanes moving in opposite directions of transmission, and between transmitted and received signals at the terminal stations. Another frequency allocation problem is encountered when an airplane drops out of its moving chain at a refueling station and is replaced by another airplane. Still another frequency allocation problem is presented by the failure of an airplane repeater station and by the necessity for maintaining a continuous transmission path between the airplanes immediately preceding and following this station. These and other frequency allocation problems are solved in accordance with this invention by employing only four carrier frequency allocations having their frequency bands closely spaced in the 6,000 megacycle range. The manner in which these four carrier frequencies are allocated for use during the different conditions of transmission discussed above will now be explained.

In Fig. 1, it can be seen that two frequency allocations F1 and F2 are used alternately over successive links of the moving chains for normal airplane-to-airplane transmission of the signal-modulated carrier waves in each direction of the system. This is sufficient to avoid interference between the airborne repeater stations especially since their antennas are highly directive and are provided with tracking equipment as was stated above. Since each airborne repeater station receives one of these two frequencies and transmits the other frequency, mutual interference and cross-talk between the transmitted and received signals at each repeater station is avoided. This also prevents the development of singing in the repeater equipments that might otherwise be caused by feedback of the signals from a transmitting antenna to the receiving antenna at the same repeater station.

Still another advantage derived from using these two frequency allocations is that interference due to skip transmission between repeater stations is avoided. This last-mentioned type of interference would be liable to occur if all the airborne repeater stations in one chain were using the same frequency allocation and if signals from one station, such as station B, should extend beyond the next link in the chain to another station, such as station D. In this event, the selective stages in the receiving equipment at station D might not be able to distinguish between the extended signals from station B and the normal signals from station C. Since the signals from stations B and C have transmission paths of different lengths, one series of signals will be delayed relative to the other series of signals with the result that interference products would be produced at station D.

Interference of the above-mentioned type is avoided when two different carrier frequencies are used for transmission between alternate links as discussed above because then the selective receiving equipment at station D can be tuned to successfully discriminate against the undesired carrier frequency F2 from station B. Although the receiving equipment at the next repeater station E is tuned to receive the carrier frequency F2, its distance from station B is greater than the extent of the line-of-sight transmission path of the carrier frequency F2 transmitted from station B. Consequently, carrier energy from station B will not be received at station E with sufficient intensity to interfere with the carrier frequency F2 transmitted from station D. Interference between the west-to-east airborne repeater stations and the east-to-west stations is avoided by providing sufficient geographical separation between the two routes and by employing proper antenna directivity.

A third carrier frequency F3 is used for transmission between the terminal stations of the west-to-east circuit and their respectively associated end relay stations. In accordance with this frequency allocation, the western terminal station WTS transmits the signal-modulated carrier frequency F3 to the end relay station A, and the other end station F completes the relay circuit by relaying the television signals to the eastern receiving terminal station ERS over the same carrier frequency F3. Similarly, a fourth carrier frequency F4 is used for transmission between the end relay stations U and Z in the east-to-west circuit and their respectively associated terminal stations ETS and WRS. Thus, as is illustrated in Fig. 1, the eastern transmitting terminal station ETS transmits the signal-modulated carried frequency F4 to the end relay station U, and the other end relay station Z completes the signal transmission circuit by relaying these signals to the western receiving terminal station WRS over the same carrier frequency F4. The repeater equipment at each airborne relay station is, of course, provided with conventional switching equipment which may be selectively controlled in any suitable manner known to those skilled in the art, such as by operating push-buttons. Thus, by selectively operating one set of push-buttons, the attendant at a relay station can cause the characteristics of the receiving equipment at his station to be switched in such a manner as to admit separately carrier energy having any one of the above-mentioned four carrier frequencies F1, F2, F3 and F4. Similarly, by selectively operating another set of push-buttons, the attendant at a repeater station can cause his transmitting equipment to transmit separately any one of the four carrier frequencies F1, F2, F3, or F4.

This allocation of fixed carrier frequencies for the terminal stations avoids the necessity of changing the carrier frequency at a terminal station each time a different repeater station appears at any of the four end positions, as would be the case if the airborne stations could only receive either the carrier frequency F1 or the carrier frequency F2. For example, if station C could receive only the carrier frequency F2, the western transmitting terminal station WTS would have to transmit signals over the carrier frequency F2 when station C entered the system. Later, when station B moved into the transmission circuit, the terminal station WTS would have to switch its carrier frequency to the carrier frequency F1. This switching process would have to be repeated each time a different airborne repeater entered the circuit, and a somewhat similar switching process would have to be employed at the corresponding receiving terminal station ERS. However, the necessity of providing equipment at the terminal stations for performing these switching operations is eliminated by the above-described allocation of fixed carrier frequencies for use at the terminal stations.

Another advantage derived from employing these terminal frequency allocations is that the use of the two different carrier frequencies F3 and F4 at each end of the two-way system materially assists in avoiding interference between transmitted and received signals at these locations. For example, if the carrier frequency F3 should be used for both the transmission and reception of signals at the western terminal stations WTS and WRS, then there might be occasions when the positions of the end repeater station Z in the east-to-west circuit and the end repeater station A in the west-to-east circuit might be such that their geographical separation and the directivity of their antennas would not be sufficient to prevent signals transmitted by station Z from entering the receiving equipment at station A and producing crosstalk therein. This is prevented by using the above-described frequency allocations because then the receiving equipment at station A will be tuned to the carrier frequency F3 and will, therefore, not admit the carrier frequency F4 transmitted by station Z.

When it is considered that during every day there are approximately 48 airplanes taking off on flights each of which extends over about 3,500 miles, it can be understood that there may be occasions when there will be a failure of a repeater station. This could be caused by either a mechanical or an electrical failure of the airborne repeating equipment. It could also be caused by a failure of one of the airplanes. In such an event, it would become necessary for the relay stations on either side of the failed relay station to bridge the gap in order to maintain a continuous transmission path for the radiant energy signals. This cannot conveniently be accomplished by using either of the normal airplane-to-airplane carrier frequencies F1 or F2 because, if this should be done, then, in order to maintain the use of different carrier frequencies alternately over successive links in the moving chain of relay stations, all of the relay stations on one side or the other of the failed relay station would have to change their transmitting and receiving carrier frequencies. It can be understood therefore that, from an operational standpoint, it would be considerably more practicable to bridge the gap by means of a special frequency allocation.

This is accomplished by using the frequency allocation F4 as an emergency carrier frequency for the west-to-east circuit, and by using the carrier frequency F3 for this purpose in the east-to-west transmission circuit. In other words, in the west-to-east transmission circuit, the carrier frequency F3 functions as a terminal frequency and the carrier frequency F4 as an emergency frequency whereas the functions of these same two frequencies are reversed in the east-to-west circuit. These frequency allocations are desirable from an operational standpoint as their use avoids considerable confusion which might otherwise occur. For example, if the carrier frequency F3 should be assigned for use by the transmitting terminal station WTS and the carrier frequency F4 should be assigned for use in transmitting to the receiving terminal station ERS, there might, in the case of an emergency, be some confusion as to which should be used to bridge the gap. This can be avoided, as was discussed above, by having each of the two carrier frequency allocations F3 and F4 serve only one function in one direction of transmission and an opposite function in the other direction of transmission.

The method of bridging the gap in the moving chain of airborne repeater stations caused by the failure of one of them is illustrated in Figs. 2A, 2B, and 2C. Fig. 2A shows a normal portion of the progressing succession of airborne relay stations in the west-to-east circuit of the system shown in Fig. 1. This portion of the chain represents the stations C, D and E as having the normal 200 mile spacing between stations C and D and between stations D and E. Station C receives the carrier frequency F2 and relays the signals over carrier frequency F1 to station D which, in turn, relays them over carrier frequency F2 to station E which retransmits them over the carrier frequency F1. In the event of a failure of one of the relay stations, such as the station D, the two 200 mile transmission links between stations C and D and stations D and E become a 400 mile gap, as is indicated in Fig. 2B, which must be bridged immediately by stations C and E in order to maintain an essentially continuous, uninterrupted transmission path for the signals that are being relayed.

Accordingly, when station D fails and drops out of the chain, the resulting 400 mile gap is immediately spanned by the attendant at station C switching his transmitting equipment from the regular carrier frequency F1 to the assigned emergency carrier frequency F4 and by the attendant at station E switching his receiving equipment from the carrier frequency F2 to the emergency carrier frequency F4. Although this 400 mile gap is twice the normal airplane-to-airplane spacing, it can be spanned with only slight degradation of the received signals because as was stated above, the normal 20,000 foot cruising altitude of the airplanes provides them with transmission paths having extra clearance for aiding in this emergency. In addition, as soon as this frequency switch has been made, airplane C increases its speed until it has widened the gap between itself and airplane B to approximately 267 miles after which time it resumes its normal 200 mile per hour speed. At the same time, airplane E circles until a spacing of about 267 miles is reached between it and airplane F after which it continues at its normal speed along its normal path. Thus, after a part of an hour, a spacing of substantially 267 miles is achieved between airplanes B and C, E and F, and C and E, as is indicated in Fig. 2C, and these airplanes maintain that spacing until reaching their receiving terminal station ERS. Since the 20,000 foot altitude provides sufficient clearance for these 267 mile transmission paths, satisfactory transmission of the signals can be maintained without interruption.

It was stated above that an airborne repeater leaves each terminal station every hour to assume a position in the continuously progressing succession of mobile relay stations. The manner in which an airplane enters the moving chain is shown in Fig. 3A wherein it can be seen than an airplane takes off from a transmitting terminal station, such as the western transmitting terminal station WTS, and climbs in a spiral path until it reaches an altitude of 20,000 feet. The airplane then circles at this altitude for a period of time until the distance between it and the airplane immediately ahead of it, such as the airplane D, becomes approximately 200 miles. It then leaves the circling area and starts upon its transatlantic route.

When an airborne repeater thus joins the moving chain, it must be prepared to do its part in maintaining a continuous uninterrupted transmission path for the radiant energy signals. The method of accomplishing this is illustrated in Fig. 3B in which it can be seen that the airplane A is on the ground waiting for its turn to take off while the airplane B has started its upward climb to the circling area which is occupied by the airplane C. The relay station C is receiving the signal-modulated carrier frequency F3 from the western transmitting terminal station WTS and is relaying the signals over the carrier frequency F2 to station D which is less than 200 miles away. Station D is, in turn, relaying the signals over carrier frequency F1 to station E which retransmits them over carrier frequency F2. Stations D and E are spaced apart by the normal 200 mile spacing. During its upward climb, station B receives the signal-modulated carrier frequency F3 from the terminal station WTS on its receiving antenna 3 and sends the signals out from its transmitting antenna 4 over carrier frequency F1. Since this is done only for the purpose of warming-up the repeater equipment at station B and for making certain that it is functioning properly, the carrier signals from station B are so directed by its transmitting antenna 4 as not to interfere with the main signaling circuit.

At the time when airplane D is about 200 miles distant from the circling area, airplane B will be approaching the circling area. Consequently, airplane C will leave the circling area and will start out on its transatlantic route. By the time the airplane C has traveled less than 5 miles along the transatlantic route, the situation which then exists is that which is represented in Fig. 3C. In Fig. 3C, airplane A has taken off on its upward climb. Station B is in the circling area and is continuing to receive the carrier frequency F3 from the terminal station WTS but is now directing the transmission of its carrier frequency F1 from its transmitting antenna 4 to the receiving antenna 5 of station C. Since station C is less than 5 miles away from the circling area, it is still receiving the carrier frequency F3 from the terminal station WTS. During this time, the signals received over the carrier frequency F1 from station B are being monitored at station C. As soon as it is determined at station C that the signals received from station B are of satisfactory quality and have a good signal-to-noise ratio, then the receiver at station C will be switched from the terminal carrier frequency F3 to the carrier frequency F1 from station B.

It might be mentioned at this point that Fig. 3C also illustrates the importance of having an emergency carrier frequency available that is different from the terminal carrier frequency. For example, with the situation shown in Fig. 3C, if station C should fail after it had switched its receiver to the carrier frequency F1 from station B, then station B would have to relay the signals directly to the next relay station D over an emergency carrier frequency. This could not be the same as the terminal carrier frequency F3 because station D might still be within the transmitting range of the terminal station WTS in which case the same carrier frequencies from the two different sources would be delayed relative to each other and would produce interference in the receiver at station D. Furthermore, if station B should transmit an emergency carrier having the frequency F3 at the same time that it is receiving carrier frequency F3 from the terminal station WTS, this would be liable to produce mutual interference and crosstalk as well as singing in the repeater equipment at station B due to the feedback of the signals from its transmitting antenna 4 to its receiving antenna 3. These same difficulties would be encountered at station D if station B should relay the signals over carrier frequency F1 because station D is using the carrier frequency F1 as a transmitting frequency. These impairments in the quality of communication are avoided by using a different emergency carrier frequency, such as the carrier frequency F4, as was described above.

It was stated above that portions of the great circle route extend over land areas. Accordingly, it is possible to establish refueling or maintenance stations at intermediate points along the route if desired. In this event, when one airplane drops out of its moving chain at an intermediate point along the route, it should be immediately replaced by another airborne repeater in order to preserve continuity of the signal transmission and signal quality. Various methods may be employed for accomplishing this; one such method being illustrated in Figs. 4A, 4B, and 4C.

Fig. 4A shows the airborne repeater stations B, C, and D of the west-to-east chain, illustrated in Fig. 1, at a time when the station C is about to be replaced by another airborne repeater M which has taken off from a refueling station RS and has climbed in a spiral path to approximately the above-mentioned cruising altitude. Since station C is receiving the signals on the carrier frequency F1 and is relaying them on carrier frequency F2, the station M has adjusted its equipment so as to receive carrier frequency F1 on its receiving antenna 25 and is using the terminal carrier frequency F3 to relay the signals from its transmitting antenna 26 to station D. During this time, station M flies parallel with station C while station D monitors the signals from station M.

When a satisfactory signal transmission path has been established between stations M and D, the attendant at station D ceases to monitor the signals from station M and switches his regular relay receiving equipment to the carrier frequency F3 now being transmitted by station M. The attendant at station D then calls the attendant at station C by means of conventional radio telephone communication equipment with which each airplane is provided and notifies him that this switch has been made. Accordingly, the attendant at station C turns off his repeating equipment and airplane C now drops out of the moving chain and descends in a spiral path to the refueling station RS as is indicated in Fig. 4B. The airplane M now moves into the position in the moving chain that was formally occupied by airplane C.

In order to permit the frequency allocation F3 to be available for this same purpose at a subsequent refueling station along the route, station M now switches its transmitting frequency from carrier frequency F3 to carrier frequency F2 as is indicated in Fig. 4C. At the same time, the relay receiving equipment at station D is switched to receive the carrier frequency F2. This simultaneous switch in carrier frequencies is effected by signals transmitted between the attendants at stations M and D by means of their above-mentioned conventional radio telephone signaling equipment. Thus, in addition to the regular airplane-to-airplane carrier frequencies F1 and F2, only the terminal frequency allocation F3 is used for effecting this substitution of an airborne repeater station, thereby reserving the frequency allocation F4 for its function as an emergency frequency. When a similar substitution of an airborne repeater station in the east-to-west circuit is to be made, the airplane making the substitution will use the frequency allocation F4 instead of the frequency F3 because, in this circuit, the frequency allocation F4 is the terminal frequency and the frequency allocation F3 is the emergency frequency.

A method of substituting one airplane for another in the moving chain which does not require the simultaneous switching of both the transmitting and receiving frequencies of the stations involved is illustrated in Figs. 5A, 5B, and 5C. The first step in this method is the same as that illustrated in Fig. 4A; namely, the airplane M to be substituted flies parallel with the airplane C to be replaced and, during this time, relays the signals over the terminal carrier frequency F3 which is monitored by the station D immediately ahead of the station C to be replaced. When it is determined at station D that the carrier frequency F3 is being received satisfactorily, the attendant at station D switches his regular relay receiving equipment from the carrier frequency F2 to the carrier fequency F3 and, by means of his conventional radio telephone communication equipment, notifies the attendant at station C that this switch has been made.

The next step in this method is illustrated in Fig. 5A wherein it can be seen that, upon being notified as was mentioned above, the attendant at station C switches his transmitting equipment to the emergency frequency allocation F4 and relays the signals over this carrier frequency to station D. Now, while station D is receiving the signals over carrier frequency F3 from station M and is relaying them over carrier frequency F1, the attendant at station D monitors the signal-modulated carrier F4 transmitted from station C. When it has been determined at station D that satisfactory reception of the signal-modulated carrier frequency F4 is being obtained, the attendant at station D switches his regular relay receiving equipment from the carrier frequency F3 to the carrier frequency F4 and then notifies the attendant at station M to this effect.

Thereupon, the attendant at station M switches his transmitting equipment to the transmitting carrier frequency F2 which was formerly assigned to station C. The signals are now being transmitted to station D over both frequency allocations F4 and F2 as is represented in Fig. 5B. Accordingly, the attendant at station D now monitors the signal-modulated carrier F2 transmitted from station M. Upon being satisfied that the signals from station M are being well received, the attendant at station D switches his regular relay receiving equipment to the carrier frequency allocation F2 and informs the attendant at station C that this has been done.

Consequently, as is shown in Fig. 5C, the attendant at station C turns off his repeating equipment and the airplane C leaves the moving chain and descends in a spiral path to the refueling station RS. At this time, the airplane M moves into the position in the moving chain that was formerly occupied by airplane C. Thus, the continuity of the signal transmission is preserved with all changes in the transmission path being under the control of the receiving station D immediately ahead of the station C to be replaced.

Although this method involves the use of the emergency frequency allocation F4, this is not a serious objection because the emergency frequency F4 is used for this purpose for only a short interval of time. While this method of substitution is somewhat longer than the method first described above, it does not require the simultaneous switching of both the transmitting and receiving frequencies of the stations involved that was described above in connection with the step illustrated in Fig. 4C. An additional advantage derived from using the method illustrated in Figs. 5A, 5B, and 5C is that all changes in the transmission path are made only after the receiving airplane D has monitored the substitute paths and has determined that satisfactory reception can be obtained. This insures that there will be no interruption, even momentarily, of the signals being relayed over the circuit.

This specific embodiment of the invention has been shown and described for the purpose of illustrating the principles and features of operation of the invention. It is to be understood that various modifications, some of which have been mentioned above, may be made without exceeding the scope of the invention which is to be limited only by the claim appended hereto.

In a two-way radiant energy relay signaling system having a first terminal location and a second terminal location with terminal relay transmitting and receiving stations at each of said terminal locations and a first plurality of mobile relay signaling stations moving in a first continuously progressing succession from said first terminal location to said second terminal location and a second plurality of mobile relay signaling stations moving in a second continuously progressing succession from said second terminal location to said first terminal location, the method of operating the system by using a plurality of carrier frequencies for relaying radiant energy signals over different portions of said system, said method comprising employing first and second carrier frequencies for alternate use in relaying signals from one mobile station to the next mobile station in each of said progressing successions, continuously using a third carrier frequency for transmitting said signals between the end mobile relay stations in said first succession and their respectively associated terminal stations, continuously using a fourth carrier frequency for transmitting said signals between the end mobile relay stations in said second succession and their respectively associated terminal stations, employing said fourth carrier frequency for emergency use in relaying said signals between two of said mobile relay stations in said first succession which are spaced apart by an intermediate mobile relay station in the same succession in the event of a failure of said intermediate station, and employing said third carrier frequency for emergency use in relaying said signals between two of said mobile relay stations in said second succession which are spaced apart by an intermediate mobile relay station in the same succession in the event of a failure of said intermediate station.

References Cited in the file of this patent

UNITED STATES PATENTS

| | | |
|---|---|---|
| 1,624,966 | Morris | Apr. 19, 1927 |
| 2,487,513 | Beverage | Nov. 8, 1949 |
| 2,530,748 | Winchel | Nov. 21, 1950 |
| 2,571,386 | Sarnoff | Oct. 16, 1951 |
| 2,598,064 | Lindenblad | May 27, 1952 |
| 2,626,348 | Nobles | Jan. 20, 1953 |
| 2,627,021 | Hansell et al. | Jan. 27, 1953 |